United States Patent Office 2,796,414
Patented June 18, 1957

2,796,414

AMINATED COPOLYMERIC PRODUCTS OF ACRYLONITRILE WITH AN ALLYL ARYL-SULFONATE

Alan G. Lowther and Frank Reeder, Coventry, England, assignors to Courtaulds Limited, London, England, a British company No Drawing. Application February 17, 1954, Serial No. 411,004

Claims priority, application Great Britain March 11, 1953

7 Claims. (Cl. 260—79.3)

This invention relates to the production of copolymeric products consisting principally of acrylonitrile, that is to say, copolymers consisting of at least 85 mol percent of acrylonitrile.

It is known that polyacrylonitrile and copolymers of acrylonitrile with other polymerisable compounds are generally difficult to dye. In order to facilitate dyeing it has been proposed to copolymerise major proportions of acrylonitrile with minor proportions of compounds of a basic nature such as vinyl pyridine (see United States Patents Nos. 2,491,471 and 2,640,049) and N-vinylimidazole (see United States Patent No. 2,603,621), so that the products can be dyed with acid dyestuffs.

It has also been proposed to produce copolymers of acrylonitrile with various types of allyl compounds, including N-allyl cyanides, 2-methallyl alcohol, 1-allyloxy-3-chloro-2-propanol and N-allyl acetamide. United States Patent No. 2,601,256 describes copolymers of acrylonitrile with unsaturated sulphonic acids of the general formula $$CH_2=C(R)-CH_2-(A)_n-SO_3H$$

in which R is hydrogen or the methyl radical, $n=0$ or 1 and A is an oxyalkylene, hydroxyalkylenoxy, thioalkylenehydroxy and thioalkylene group.

The object of the present invention is to produce an acrylonitrile type of copolymer having improved affinity for acid dyestuffs.

In accordance with the present invention, a copolymer having improved dyeing properties is produced by copolymerising acrylonitrile with an aryl sulphonic ester of an unsaturated alcohol, the ester having the general formula $$CH_2=C(R)-R'-O-SO_2-R^2$$

in which R is hydrogen or the methyl radical, R' is a divalent hydrocarbon group, preferably —$CH_2$—, and $R^2$ is an aryl group, which may be substituted, the proportions of acrylonitrile and of said ester being such that the copolymer contains at least 85 mol percent of acrylonitrile and from 0.5 to 10 mol percent of the ester, and subsequently reacting the copolymer so produced with ammonia, a primary amine, a secondary amine or a tertiary amine. It is believed that in the reaction with ammonia, a primary amine or a secondary amine, —O—$SO_2$—$R^2$ groups in the copolymer are split off and replaced by amino or substituted amino groups; when a tertiary amine is used a quaternary ammonium sulphonate is formed.

The main reactions involved in the present invention are believed to be as follows:

(a) With ammonia:

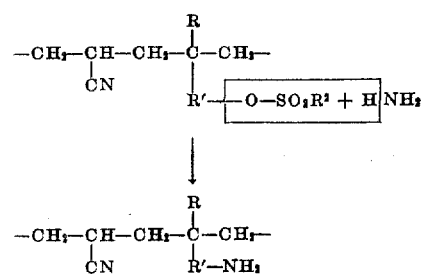

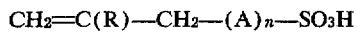

(b) With a primary amine ($R^3NH_2$):

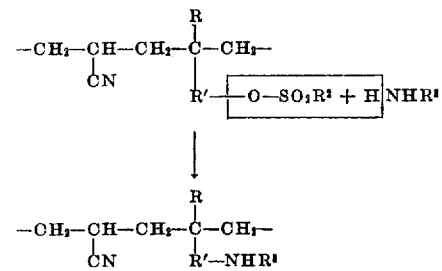

(c) With a secondary amine:
(i) Of the type

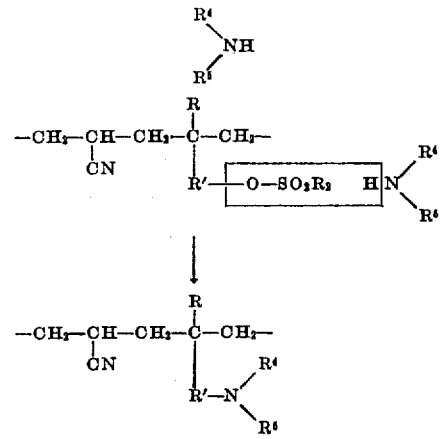

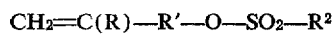

(ii) Piperidine and similar ring compounds:
The reaction is the same as for $c(i)$ but $R^4$ and $R^5$ together with the N atom form a ring such as

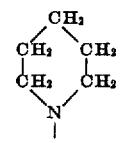

for piperidine.

(d) With a tertiary amine

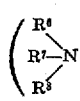

or an aromatic ring compound such as pyridine).

In such cases a quaternary ammonium sulphonate compound is formed thus:

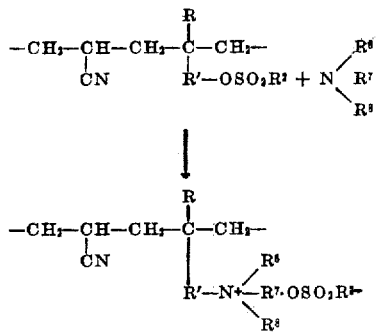

With pyridine $R^6$, $R^7$ and $R^8$ together with the N atom form the ring

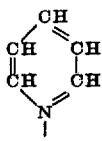

The invention therefore also includes a copolymer in which at least 85 percent of the repeating units in the polymer consists of acrylonitrile units together with other units having the general formula

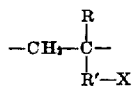

in which R is hydrogen or a methyl radical, R' is a divalent hydrocarbon group, preferably —$CH_2$—, and X is one of the radicals (a) —$NH_2$,
(b) —$NHR^3$, $R^3$ being a monovalent hydrocarbon group,
(c) $N\begin{smallmatrix}R^4\\R^5\end{smallmatrix}$, $R^4$ and $R^5$ being monovalent hydrocarbon groups or forming with the N atom a heterogeneous ring, or
(d) A quaternary ammonium sulphonate radical.

Examples of suitable primary amines which can be used in this invention are ethylamine, aniline and the toluidines; a suitable secondary amine is diethylamine; suitable tertiary amines are pyridine, α picoline, dimethyl aniline and dimethyl p-toluidine.

The preferred aryl sulphonic ester is allyl paratoluene sulphonate,

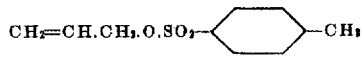

but other esters such as 2-methallyl para-toluene sulphonate

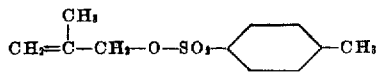

may be used. These compounds are conveniently copolymerised with acrylonitrile in the form of an aqueous emulsion.

The reaction of the copolymer of acrylonitrile and the unsaturated ester as defined above is preferably effected by heating the two reactants together. For example, the copolymer may be immersed for a suitable time in a heated solution of ammonia or an amine or the copolymer may be treated with the heated vapour of ammonia or an amine.

The ammonia or amine treatment may be carried out using the copolymer in particulate form such as normally obtained by the emulsion polymerisation process or the copolymer may be formed into the desired shape, for example as filament or film, and then treated with ammonia or an amine. It is not necessary to react all the —$OSO_2$—$R^2$ groups in the copolymer provided that a sufficient proportion of the groups are reacted to give the required improvement in dye receptivity.

Minor proportions, for example up to 10 mol percent, of one or more other polymerisable compounds such as methyl acrylate, styrene, vinyl acetate, ethyl acrylate, methyl methacrylate and similar compounds may also be advantageously included in the copolymer. The inclusion of such further components generally increases the solubility of the copolymers, for example in aqueous salt or aqueous alcoholic salt solutions.

As different monomers generally polymerise at different rates it is usually necessary to select the proportions of the monomers in the initial monomeric mixture or to adjust the proportions of the mixture during polymerisation so that the polymer finally obtained contains at least 85 mol percent of acrylonitrile and from 0.5 to 10 mol percent of the unsaturated aryl sulphonic ester as defined above.

The invention is illustrated by the following examples in which parts and percentages are by weight.

Example 1

Allyl p-toluene sulphonate was prepared by reacting allyl alcohol with p-toluene sulphonyl chloride.

3.5 parts (5 mol percent) of allyl p-toluene sulphonate and 16.5 parts (95 mol percent) of acrylonitrile were emulsified in 30 parts of water containing 1 percent of an emulsifying agent. 2 parts of a 1 percent aqueous solution of ammonium persulphate and 2 parts of a 1 percent aqueous solution of potassium metabisulphite were added and the mixture was refluxed for 20 minutes with stirring. The copolymer, consisting of 98 mol percent of acrylonitrile and 2 mol percent of allyl p-toluene sulphonate, which had separated was filtered off, washed with water and acetone and dried at 70° C.

The dried copolymer was then immersed in an excess of 5 percent alcoholic ammonia for one hour at 50° C. The copolymer was separated, washed and dried at 75° C.

The dyeing properties of the resultant copolymer using Azo-Geranine 2G (Colour Index No. 31) were compared with those of (1) 100 percent polyacrylonitrile, (2) a 95 to 5 mol percent acrylonitrile-methyl acrylate copolymer and (3) the copolymer produced as described above before the ammonia treatment. The dye uptake by the product of the example was greater than that of the other three; the 100 percent polyacrylonitrile and the acrylonitrile-methyl acrylate copolymer were substantially uncoloured and although the intermediate copolymer of the example was coloured to some extent, the colour was not that usually associated with Azo-Geranine 2G.

Similar results were obtained with the acid dyes, Lisamine Green VS, Solway Blue BN and Coomassie Milling Scarlet G.

Example 2

The procedure described in Example 1 was repeated with one variation only, namely that a 10 percent aqueous ammonia solution was used in place of the 5 percent alcoholic ammonia solution. The dye uptake of the product was about the same as that of the product of Example 1.

Example 3

A copolymer of 98 mol percent of acrylonitrile and 2 mol percent of allyl p-toluene sulphonate prepared as described in Example 1 was heated under a reflux condenser with excess pyridine for two hours. The copolymer was filtered off and boiled with water to remove occluded pyridine. The copolymer was then dried at 75° C.

The copolymer exhibited a good dye uptake with Azo-Geranine 2G.

Example 4

91.2 parts (86 mol percent) of acrylonitrile, 10.4 parts (6 mol percent) of methyl acrylate and 34 parts (8 mol per cent) of allyl para-toluene-sulphonate were mixed together. 33 parts of the mixture were added with stirring to 250 parts of distilled water containing about ½ percent of an emulsifying agent. The resultant emulsion was stirred and the temperature raised to 40° C. while nitrogen was slowly bubbled through. An aqueous solution containing 0.6 part of ammonium persulphate and 0.6 part of potassium meta-bisulphite was added and as soon as a rise in temperature was observed the remaining mixture of monomers was added dropwise from a dropping funnel. The temperature was kept at 40° C. by using a cooling bath and adjusting the rate of addition of the monomer mixture. When the reaction was complete, the emulsion was broken by boiling and the precipitate was filtered off, washed first with boiling water, then with acetone and dried at 75° C.

The intrinsic viscosity of the ternary polymer (in dimethyl formamide) was 1.18 and its nitrogen content (Kjeldahl) was 21.9 percent. Its composition was 89.8 mol percent of acrylonitrile, 7.2 mol percent of methyl acrylate and 3.0 mol percent of allyl p-toluene sulphonate.

The polymer was then heated under reflux with excess pyridine for 2 hours; it was then filtered off, washed with hot water and dried at 75° C.

15 parts of this treated polymer were dissolved in 85 parts of a solution containing 45 parts of sodium thiocyanate, 27.5 parts of water and 27.5 parts of methyl alcohol. The solution formed was extruded through a jet containing 33 holes, each 0.004 inch in diameter, into water at 20° C. and the tow formed was washed in water, stretched 1700 percent in steam and collected in skein form. The yarn had a denier of 108, a tenacity of 2.3 grams per denier and an extensibility of 15 percent. Both the treated polymer and yarn showed an excellent uptake of acid dyes.

*Example 5*

15 percent of pyridine was added to the polymer produced by the method of polymerisation described in Example 4. The treated polymer was placed in a flask which was then chilled, evacuated and sealed off. The flask was then heated in an oven at 115° C. for 2 hours. The resulting polymer showed a considerably improved uptake for acid dyes.

The evacuation of the flask may be omitted if desired.

*Example 6*

The polymerisation procedure described in Example 4 was used to polymerise a mixture of 90 mol percent of acrylonitrile, 5 mol percent of methyl acrylate and 5 mol percent of allyl p-toluene sulphonate. The polymer, after the filtering operation, was washed with pyridine on a Buchner funnel and sucked as dry as possible. The polymer was then placed in a vessel which was closed and heated for 3 hours in an oven at 115° C. Excess pyridine was then removed from the polymer by washing with hot water and acetone and the polymer was dried at 60° C.

The product had an improved take-up for acid dyes. If desired, the polymer can be bleached without adversely affecting its dyeing properties.

*Example 7*

Four samples of a copolymer consisting of 97 mol percent of acrylonitrile and 3 mol percent of allyl p-toluene sulphonate were treated for 1 hour with an excess of aniline under nitrogen at temperatures of 80° C., 100° C., 120° C. and 150 C. respectively. The samples were washed with acetone and dried at 70 C.

All four samples were dyed at 90° C. with 1 percent of Azo-Geranine using 50 volumes of water containing 4 percent of sulphuric acid based on the weight of the sample. The dye exhaustions of the dyebaths were as follows:

| Temperature of treatment | Percent dye exhaustion |
|---|---|
| 80° C | 20 |
| 100° C | 44 |
| 120° C | 87 |
| 150° C | 100 |

The dye exhaustion of the untreated copolymer is negligible.

*Example 8*

10 percent of pyridine was added to a copolymer consisting of 97.8 mol percent of acrylonitrile and 2.2 mol percent of allyl p-toluene sulphonate. The treated copolymer was placed in a vessel which was then evacuated to a pressure of 2 centimetres of mercury and heated at 65 C. for 24 hours. Excess pyridine was removed by distillation and the polymer was washed and dried. The treated copolymer had improved dye absorption. Analysis showed that the product contained 0.8 mol percent of available quaternary ammonium groups.

When the same procedure was used with a copolymer of 96.9 mol percent of acrylonitrile and 3.1 mol percent of allyl p-toluene sulphonate, the product contained 1.4 mol percent of available quaternary ammonium groups.

*Example 9*

10 percent of pyridine was added to the copolymer used in Example 8 and the treated copolymer was placed in a vessel which was then evacuated to a pressure of 2.6 centimetres of mercury. It was heated at 115° C. for 3 hours. The product was purified as described in Example 8; it had excellent receptivity for acid dyes and contained 0.5 mol percent of available quaternary ammonium groups.

What we claim is:

1. A process for improving the dyeing properties of acrylonitrile aryl sulphonic ester copolymers formed by copolymerising acrylonitrile with an aryl sulphonic ester of an unsaturated alcohol, said ester having the general formula $CH_2=C(R)-R'-O-SO_2-R^2$ in which R is selected from the group consisting of hydrogen and the methyl radical, R' is a divalent hydrocarbon group and $R^2$ is an aryl group, said copolymer containing at least 85 mol percent of acrylonitrile and from 0.5 to 10 mol percent of said ester, which comprises reacting said copolymer with a compound selected from the group consisting of ammonia, primary amines, secondary amines and tertiary amines.

2. A process for improving the dyeing properties of acrylonitrile aryl sulphonic ester copolymers formed by copolymerising acrylonitrile with an aryl sulphonic ester of an unsaturated alcohol, said ester having the general formula $CH_2=C(R)-CH_2-O-SO_2-R^2$ in which R is selected from the group consisting of hydrogen and the methyl radical and $R^2$ is an aryl group, said copolymer containing at least 85 mol percent of acrylonitrile and from 0.5 to 10 mol percent of the said ester, which comprises reacting said copolymer with a compound selected from the group consisting of ammonia, primary amines, secondary amines and tertiary amines.

3. A process for improving the dyeing properties of acrylonitrile-aryl sulphonic ester copolymers formed by copolymerising acrylonitrile with an aryl sulphonic ester of an unsaturated alcohol, said ester having the general formula $CH_2=C(R)-CH_2-O-SO_2-R^2$ in which R is selected from the group consisting of hydrogen and the methyl radical and $R^2$ is an aryl group, said copolymer containing at least 85 mol percent of acrylonitrile and from 0.5 to 10 mol percent of said ester, which comprises reacting said copolymer with pyridine.

4. A process for improving the dyeing properties of acrylonitrile-aryl sulphonic ester copolymers formed by copolymerising acrylonitrile with an aryl sulphonic ester of an unsaturated alcohol, said ester having the general formula $CH_2=C(R)-CH_2-O-SO_2-R^2$ in which R is selected from the group consisting of hydrogen and the methyl radical and $R^2$ is an aryl group, and with at least one other polymerisable compound, said copolymer containing at least 85 mol percent of acrylonitrile, from 0.5 to 10 mol percent of said ester and not more than 10 mol percent of said other polymerisable compound, which comprises reacting said copolymer with a compound selected from the group consisting of ammonia, primary amines, secondary amines and tertiary amines.

5. A process for improving the dyeing properties of acrylonitrile-aryl sulphonic ester copolymers formed by copolymerising acrylonitrile with an aryl sulphonic ester of an unsaturated alcohol, said ester having the general formula $CH=C(R)-CH_2-O-SO_2-R^2$ in which R is selected from the group consisting of hydrogen and the methyl radical and $R^2$ is an aryl group, and with at least one other polymerisable compound, said copolymer containing at least 85 mol percent of acrylonitrile, from 0.5 to 10 mol percent of said ester, and not more than 10 mol percent of said other polymerisable compound which comprises reacting said copolymer with pyridine.

6. A process for improving the dyeing properties of acrylonitrile-aryl sulphonic ester copolymers formed by copolymerising acrylonitrile with an aryl sulphonic ester of an unsaturated alcohol, said ester having the general formula $CH_2=C(R)-CH_2-O-SO_2-R^2$ in which R is selected from the group consisting of hydrogen and the methyl radical and $R^2$ is an aryl group, and with methyl acrylate, said copolymer containing at least 85 mol percent of acrylonitrile, from 0.5 to 10 mol percent of said ester and not more than 10 mol percent of methyl acrylate, which comprises reacting said copolymer with a compound selected from the group consisting of ammonia, primary amines, secondary amines and tertiary amines.

7. A process for improving the dyeing properties of acrylonitrile-aryl sulphonic ester copolymers formed by copolymerising acrylonitrile with an aryl sulphonic ester of an unsaturated alcohol, said ester having the general formula $CH_2=C(R)-CH_2-O-SO_2-R^2$ in which R is selected from the group consisting of hydrogen and the methyl radical and $R^2$ is an aryl group, and with methyl acrylate, said copolymer containing at least 85 mol percent of acrylonitrile, from 0.5 to 10 mol percent of said ester and not more than 10 mol percent of methyl acrylate which comprises reacting said copolymer with pyridine.

References Cited in the file of this patent
UNITED STATES PATENTS 2,667,469 Sauer _____ Jan. 26, 1954

OTHER REFERENCES

Reynolds et al.: Journal American Chem. Soc., 72, 1587–1593, April 1950.

UNITED STATES PATENT OFFICE
Certificate of Correction

Patent No. 2,796,414 June 18, 1957

Alan G. Lowther et al.

It is hereby certified that error appears in the printed specification of the above numbered patent requiring correction and that the said Letters Patent should read as corrected below.

Column 7, line 16, for "$CH=C(R)-CH_2-O-SO_2-R^2$" read $-CH_2=C(R)-CH_2-O-SO_2-R^2-$.

Signed and sealed this 1st day of October 1957.

[SEAL]

Attest:
KARL H. AXLINE,
*Attesting Officer.*

ROBERT C. WATSON,
*Commissioner of Patents.*